(12) United States Patent
Wang

(10) Patent No.: US 12,379,499 B2
(45) Date of Patent: Aug. 5, 2025

(54) DISTANCE MEASUREMENT DEVICE USING TWO ALGORITHMS

(71) Applicant: PIXART IMAGING INC., Hsin-Chu (TW)

(72) Inventor: Guo-Zhen Wang, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 575 days.

(21) Appl. No.: 17/846,496

(22) Filed: Jun. 22, 2022

(65) Prior Publication Data

US 2023/0018006 A1 Jan. 19, 2023

Related U.S. Application Data

(60) Provisional application No. 63/222,455, filed on Jul. 16, 2021.

(51) Int. Cl.
*G01S 17/48* (2006.01)
*G01S 7/48* (2006.01)

(52) U.S. Cl.
CPC ............ *G01S 17/48* (2013.01); *G01S 7/4808* (2013.01)

(58) Field of Classification Search
None
See application file for complete search history.

(56) References Cited

U.S. PATENT DOCUMENTS

| 11,353,884 B2 | 6/2022 | Lin et al. | |
| 2004/0119035 A1* | 6/2004 | Kong | G01B 11/2513 250/559.38 |
| 2016/0187485 A1 | 6/2016 | Wang | |

* cited by examiner

*Primary Examiner* — Luke D Ratcliffe
(74) *Attorney, Agent, or Firm* — HAUPTMAN HAM, LLP

(57) ABSTRACT

There is provided an optical distance measurement device including a processor embedded with a first algorithm and a second algorithm. The first algorithm is used to calculate an object depth when an obstacle is distanced from the distance measurement device smaller than a predetermined distance. The second algorithm is used to calculate an object depth when the obstacle is distanced from the distance measurement device larger than the predetermined distance.

17 Claims, 3 Drawing Sheets

| Correct Distance | Error of 1st Algorithm | Error of 2nd Algorithm |
|---|---|---|
| 21cm | 0.1287743959 | 0.3754446597 |
| 22cm | 0.1218867269 | 0.3475384482 |
| 23cm | 0.471844637 | 0.1357862234 |
| 24cm | 0.956123428 | 0.2691481856 |
| 25cm | 1.507438705 | 0.7784410618 |

FIG. 4

DISTANCE MEASUREMENT DEVICE USING TWO ALGORITHMS

RELATED APPLICATIONS

The present application claims the priority benefit of U.S. Provisional Application Ser. No. U.S. 63/222,455, filed on Jul. 16, 2021, the disclosure of which is hereby incorporated by reference herein in its entirety.

BACKGROUND

1. Field of the Disclosure

This disclosure generally relates to a distance measurement and, more particularly, to a distance measurement method using two different algorithms to calculate an object depth corresponding to difference distances and a distance measurement device using the same.

2. Description of the Related Art

In an optical cleaning robot, a vertical light section is projected therefrom toward a moving direction, and an image sensor acquires an image frame containing an image of the vertical light section. A processor of the optical cleaning robot then calculates a distance of an obstacle according to a distance of the image of the vertical light section from a predetermined position in the image frame, e.g., referring to U.S. patent application Ser. No. 16/258,675, entitled "ROBOT WITHOUT DETECTION DEAD ZONE" filed on Jan. 28, 2019, assigned to the same assignee of the present application, and the full disclosure of which is incorporated herein by reference.

However, different applications generally require different degrees of accuracy within different distance ranges. For example, in the wall-following application, it is desired a high distance accuracy in a closer distance range such that the cleaning robot can keep an identical distance from a wall; whereas, in the obstacle detection application, it is desired a high distance accuracy in a farther distance range such that it is able to detect an obstacle as early as possible.

Accordingly, a distance measurement device capable of obtaining high distance accuracy in both closer and farther distances is required.

SUMMARY

The present disclosure provides an optical distance measurement device using two different algorithms corresponding to different distance ranges so as to obtain high distance accuracy and resolution in the whole detection range of the distance measurement device, and an operating method thereof.

The present disclosure provides a distance measurement device including a light source, an image sensor and a processor. The light source is configured to project a linear light section toward a moving direction. The image sensor is configured to capture an image frame containing an image of the linear light section. The processor is configured to calculate a gravity center of the image of the linear light section in the image frame, use a first algorithm to calculate a first object depth upon the gravity center being smaller than a position threshold, and use a second algorithm to calculate a second object depth upon the gravity center being larger than the position threshold.

The present disclosure further provides a distance measurement device including a light source, an image sensor and a processor. The light source is configured to project a linear light section toward a moving direction. The image sensor is configured to capture an image frame containing an image of the linear light section. The processor, configured to calculate a gravity center of the image of the linear light section in the image frame, use a first algorithm to calculate a first object depth, upon the first object depth being smaller than a distance threshold, directly output the first object depth, and upon the first object depth being larger than the distance threshold, use a second algorithm to calculate a second object depth.

The present disclosure further provides a distance measurement device including a light source, an image sensor and a processor. The light source is configured to project a linear light section toward a moving direction. The image sensor is configured to capture an image frame containing an image of the linear light section. The processor, configured to use a first algorithm to calculate a first object depth upon a position of the image of the linear light section in the image frame not exceeding a predetermined position, and use a second algorithm to calculate a second object depth upon the position of the image of the linear light section in the image frame exceeding the predetermined position.

BRIEF DESCRIPTION OF THE DRAWINGS

Other objects, advantages, and novel features of the present disclosure will become more apparent from the following detailed description when taken in conjunction with the accompanying drawings.

FIG. 4 is a table listing errors of different algorithms calculated by a distance measurement device according to one embodiment of the present disclosure.

DETAILED DESCRIPTION OF THE EMBODIMENT

It should be noted that, wherever possible, the same reference numbers will be used throughout the drawings to refer to the same or like parts.

One objective of the present disclosure is to provide an optical distance measurement device capable of calculating an object distance using different algorithms, e.g., a first algorithm being used when the object distance is smaller than or equal to a predetermined distance and a second algorithm, different from the first algorithm, being used when the object distance is larger than the predetermined distance such that a high distance resolution and accuracy can be achieved in the whole detection range. The optical distance measurement device is, for example, a cleaning robot or a conveying robot, but the present disclosure is not limited thereto. The present disclosure is applicable to any navigation device using an optical scheme to calculate a distance of an obstacle in front of a moving direction without particular limitations.

Figure 1:
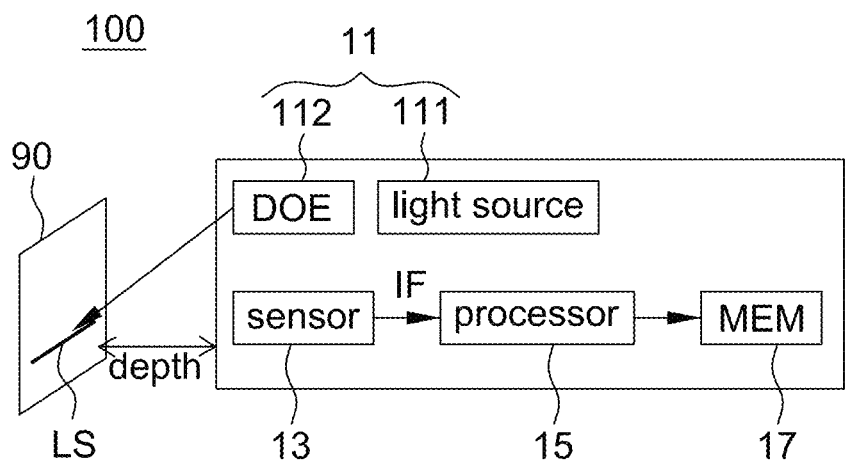
FIG. 1 is a schematic block diagram of a distance measurement device according to one embodiment of the present disclosure.

Please refer to FIG. 1, it is a schematic block diagram of a distance measurement device 100 according to one embodiment of the present disclosure. The distance measurement device 100 includes a light source module (sometimes abbreviated as a light source hereinafter) 11, an image sensor (abbreviated as sensor in FIG. 1) 13, a processor 15 and a memory (abbreviated as MEM in FIG. 1) 17. The distance measurement device 100 is for detecting a depth (i.e. distance) of an obstacle 90 in front of a moving direction (e.g., left direction in FIG. 1). It should be mentioned that although FIG. 1 shows that the obstacle 90 is a plan surface (such as a wall), the present disclosure is not limited thereto. The obstacle 90 is an object having any shape and appearing in a moving path of the distance measurement device 100.

The memory 17 is a volatile memory or a non-volatile memory without particular limitations.

The light source module 11 includes a light source 111 and a diffractive optical element (shown as DOE in FIG. 1) 112. The light source 111 is a coherent light source (e.g., a laser diode) or a non-coherent light source (e.g., a light emitting diode) for projecting light having an identifiable spectrum (e.g., IR light) and passing the DOE 112. The DOE 112 shapes the light passing thereby to become a linear light section LS. More specifically, the light source module 111 projects a linear light section LS toward a moving direction of the distance measurement device 100.

It should be mentioned that although FIG. 1 shows that the linear light section LS is a horizontal light section, i.e. parallel to a work surface (not shown) on which the distance measurement device 100 is moving, the present disclosure is not limited thereto. In another aspect, the light source module 111 projects a vertical (i.e. perpendicular to the work surface) light section based on the arrangement of the DOE 112. One method of calculating the object depth using the vertical light section and the horizontal light section may be referred to U.S. patent application Ser. No. 16/258,675, filed on Jan. 28, 2019, but the present disclosure is not limited thereto.

The image sensor 13 is selected from a CMOS image sensor, a CCD image sensor or an organic photoconductor image sensor without particular limitations. The image sensor 13 has a field of view to capture an image frame (shown as IF in FIG. 1) containing an image of the linear light section LS. The image frame IF is transferred to the processor 15 for post-processing, e.g., calculating a depth according to different algorithms.

The processor 15 is a digital signal processor (DSP), an application specific integrated circuit (ASIC), a field programmable gate array (FPGA), a microprocessor unit (MCU) or the like. The processor 15 is coupled to the light source 111 and the image sensor 13 for controlling operations thereof, e.g., controlling the image sensor 13 to capture image frames IF corresponding to the lighting of the light source 111. In the present disclosure, the processor 15 calculates a depth of the obstacle 90 using two different algorithms previously embedded therein, e.g., implemented by hardware and/or firmware.

Figure 2:
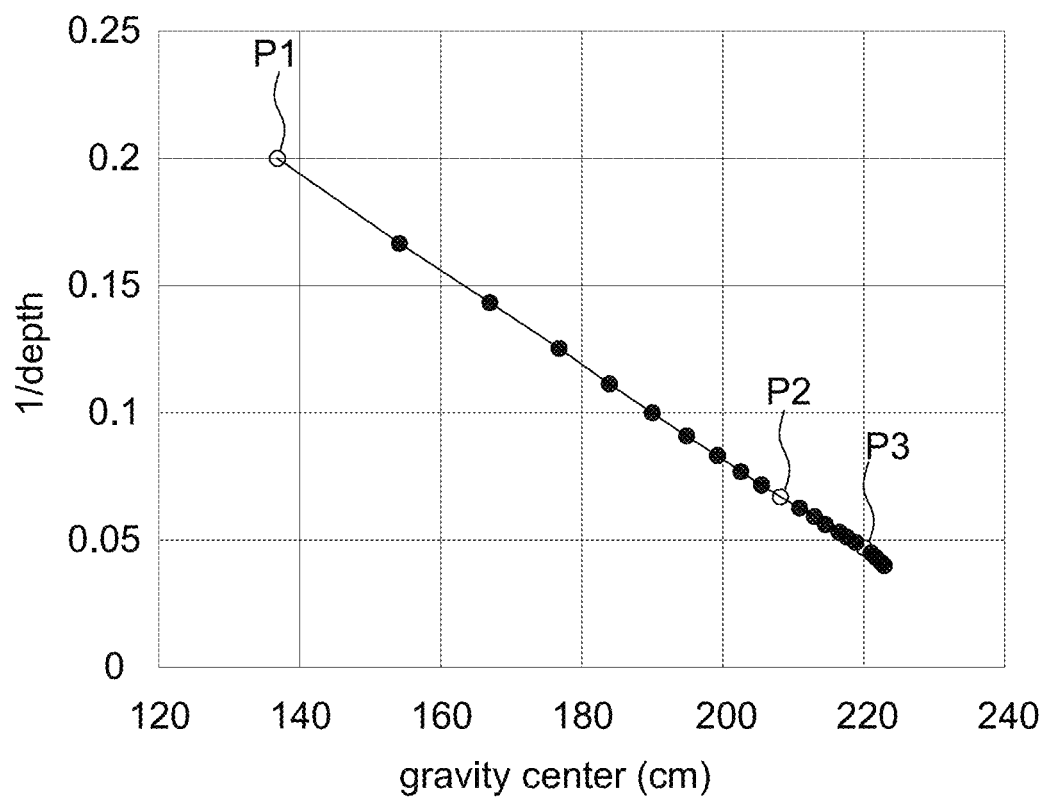
FIG. 2 is a schematic diagram of determining an object depth using a first algorithm by a distance measurement device according to one embodiment of the present disclosure.

Please refer to FIG. 2, it is a schematic diagram of determining an object depth using a first algorithm by a distance measurement device 100 according to one embodiment of the present disclosure. In the first algorithm, a first object depth is calculated according to a relationship between gravity centers (shown at transverse axis) and a reciprocal of depths (shown as l/depth at vertical axis).

In one aspect, the distance measurement device 100 includes a memory 17 for recording the reciprocal of depths corresponding to each gravity center calculated by the processor 15. Once a gravity center is obtained, the processor 15 knows a corresponding object depth by accessing the memory 17.

In another aspect, the processor 15 calculates an object depth using a linear interpolation method since FIG. 2 shows a relationship close to a linear relationship. For example, the memory 17 records three gravity centers and three corresponding depths P1, P2 and P3, wherein P1=5 cm, P2=15 cm and P3=20 cm, but not limited thereto. While obtaining a gravity center between P1 and P2, the processor 15 calculates a corresponding depth using the interpolation method based on P1 and P2; whereas while obtaining a gravity center between P2 and P3, the processor 15 calculates a corresponding depth using the interpolation method based on P2 and P3. Details of the interpolation method are known to the art, and thus are not described herein.

However, it is seen from FIG. 2 that when the object depth is farther, e.g., larger than 20 cm (or l/depth=0.05), a variation of the gravity center is too tiny such that if there is any disturbance caused by noises, incorrect object depth is obtained. Furthermore, since one gravity center is corresponding to a reciprocal of depth, in order to obtain a high accuracy, a number of digits to the right of the decimal point should be as large as possible. However, in actual operation, the number of digits is limited and if the number of digits is not enough, data overflow can occur to cause inaccuracy in calculating the object depth.

Details of obtaining a gravity center of an image of a linear light section LS may be referred to U.S. Patent Publication No. U.S. 20160187485, entitled "METHOD AND SYSTEM FOR OPTICAL DISTANCE MEASUREMENT" filed on Sep. 24, 2015, assigned to the same assignee of the present application, and the full disclosure of which is incorporated herein by reference. Briefly speaking, the gravity center is a pixel position (e.g., a pixel row corresponding to a horizontal light section or a pixel column corresponding to a vertical light section) of an image of the light section LS in an image frame IF captured by the image sensor 13.

Figure 3:
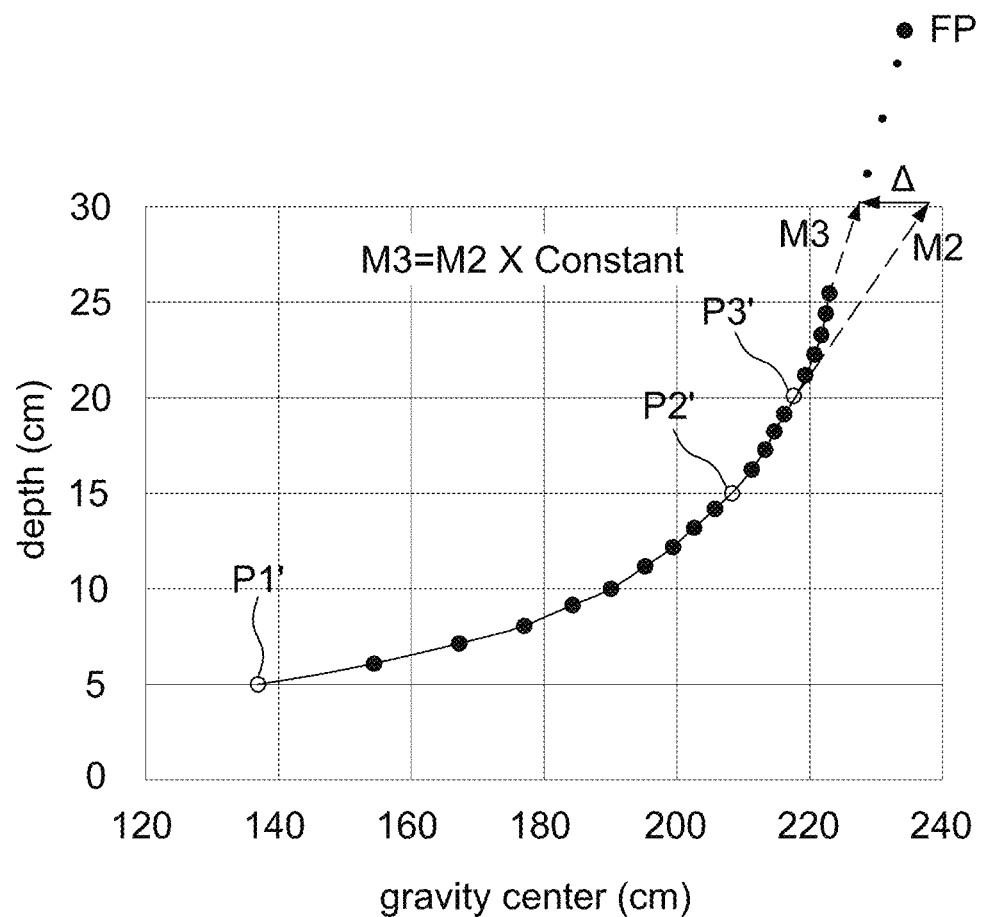
FIG. 3 is a schematic diagram of determining an object depth using a second algorithm by a distance measurement device according to one embodiment of the present disclosure.

Please refer to FIG. 3, it is a schematic diagram of determining an object depth using a second algorithm by a distance measurement device 100 according to one embodiment of the present disclosure. In the second algorithm, a second object depth is calculated according to a relationship between gravity centers (shown at transverse axis) and depths (shown at vertical axis). It is seen from FIG. 3 that if the gravity center is large enough, a variation of depths with respect to the gravity center is close to a linear relationship. In the second algorithm, the processor 15 uses a linear extrapolation method to calculate the object depth corresponding to a calculated object center. For example, the memory 17 records a constant for calibration a slope M2, which is the slope between referenced depths P2' and P3'. In one aspect, P1 and P1' are corresponding to the same object depth, e.g., 5 cm, P2 and P2' are corresponding to the same object depth, e.g., 15 cm; and P3 and P3' are corresponding to the same object depth, e.g., 20 cm, but the present disclosure is not limited thereto. Said constant is previously obtained (e.g., before shipment) using M3/M2, wherein M3 is a slope between the reference depth P3' and the farthest point FP (e.g., 40 cm, but not limited to) that the distance measurement device 100 is required to detect. The memory 17 previously records M3, or records said constant and M2. The processor 15 calculates an object depth using an equation:

$$20 + M3 \times [\text{gravity}(i) - \text{gravity}(20)], \text{ in which only gravity}(i) \text{ is unknown,}$$

wherein 20 is a depth of the point P3', gravity(20) is a gravity center of the point P3', and gravity(i) is a gravity center of any point farther than P3' but closer than FP. It should be mentioned that FP is determined according to the requirement and ability of the distance measurement device 100.

In the present disclosure, the processor 15 is embedded with different rules to use the first algorithm or the second algorithm to calculate an object depth.

In one aspect, the processor 15 calculates a gravity center of the image of the linear light section LS in the image frame IF captured by the image sensor 13, uses a first algorithm (e.g., shown in FIG. 2) to calculate a first object depth when the gravity center is smaller than or equal to a position threshold, and uses a second algorithm to calculate a second object depth when the gravity center is larger than the position threshold. For example, FIG. 4 shows errors of the first algorithm and the second algorithm associated with different correct distances (e.g., shown as 21 cm to 25 cm). The position threshold is determined previously (e.g., before shipment) using several ways.

The position threshold is determined according to an error of the first object depth calculated by the first algorithm being larger than an error threshold. For example, if the error threshold is selected as 0.2 cm, the position threshold is selected as 23 cm which has an error=0.471844637 larger than 0.2 cm.

The position threshold is determined according to a first error of the first object depth calculated by the first algorithm being larger than a second error of the second object depth calculated by the second algorithm. For example, the first error (shown as 0.471844637) is larger than the second error (shown as 0.135786234) at 23 cm, and thus the position threshold is selected as 23 cm.

The position threshold is determined using the first algorithm according to a variation of a reciprocal of first object depth with respect to the gravity center being smaller than a variation threshold. It is seen from FIG. 2 that when the gravity center is large enough, e.g., the depth more than 20 cm, a variation of a reciprocal of depth with respect to the gravity center is almost not distinguishable. Therefore, a suitable variation of a reciprocal of depth is previously selected to determine the position threshold.

The position threshold is determined using the second algorithm according to a slope of second object depths with respect to the gravity center being larger than a slope threshold. It is seen from FIG. 3 that when the gravity center is large enough, the slope of second object depths with respect to the gravity center is close to a linear relationship, which is suitable for extrapolation method. Therefore, a suitable slope of second object depths with respect to the gravity center is previously selected to determine the position threshold.

By comparing FIGS. 2 and 3, it is a selection to use P3 and P3' as a threshold to separate the usage of the first algorithm and the second algorithm.

In another aspect, the processor 15 calculates a gravity center of the image of the linear light section LS in the image frame IF captured by the image sensor 13, uses a first algorithm (e.g., shown in FIG. 2) to calculate a first object depth, directly outputs the first object depth when the first object depth is smaller than or equal to a distance threshold, and uses a second algorithm to calculate a second object depth when the first object depth is larger than the distance threshold. Similarly, the distance threshold is determined previously (e.g., before shipment) using several ways.

In this aspect, only the first object depth is calculated when the first object depth is smaller than or equal to the distance threshold; whereas the first object depth and the second object depth are both calculated when the first object depth is larger than the distance threshold.

The distance threshold is determined according to an error of the first object depth calculated by the first algorithm being larger than an error threshold. Or, the distance threshold is determined according to a first error of the first object depth calculated by the first algorithm being larger than a second error of the second object depth calculated by the second algorithm. Or, the distance threshold is determined using the first algorithm according to a variation of a reciprocal of first object depth with respect to the gravity center being smaller than a variation threshold. Or, the distance threshold is determined using the second algorithm according to a slope of second object depths with respect to the gravity center being larger than a slope threshold.

The methods of determining the distance threshold are similar to those of determining the position threshold as above, and thus are not repeated herein.

In an alternative embodiment, the processor 15 uses a first algorithm to calculate a first object depth when a position of the image of the linear light section LS in the image frame IF does not exceed a predetermined position, and uses a second algorithm to calculate a second object depth when the position of the image of the linear light section LS in the image frame IF exceeds the predetermined position.

It is seen from FIG. 1 that because the light source module 111 projects the light section LS with an angle, a position of the linear light section LS on the obstacle 90 changes (e.g., upward or downward) when a value of depth changes, and thus a position of the image of the linear light section LS in the image frame IF is previously (e.g., before shipment) used herein to determine a predetermined position for separating the usage of the first algorithm and the second algorithm.

In one aspect, the predetermined position is determined according to a variation of the position of the image of the linear light section LS in the image frame IF with respect to a distance (shown as depth in FIG. 1) between the light source 11 and the obstacle 90 on which the linear light section LS is projected being smaller than or equal to a variation threshold. That is, when the variation of the position of the image of the linear light section LS in the image frame IF changes more than the variation threshold, a different algorithm (e.g., the second algorithm) is used to calculate the object depth.

In another aspect, the predetermined position is determined according to the position of the image of the linear light section LS in the image frame IF corresponding to a predetermined distance between the light source 11 and the obstacle 90 on which the linear light section LS is projected. That is, the predetermined distance between the light source 11 and the obstacle 90 determines a position of the image of the linear light section LS in the image frame IF.

In the aspect that the linear light section LS is a vertical light section, the predetermined position is at least one pixel column of the image frame IF. In the aspect that the linear light section LS is a horizontal light section, the predetermined position is at least one pixel row of the image frame IF.

It is appreciated that values, including depths, gravity centers, slopes, thresholds and errors, in the present disclosure are only intended to illustrate but not to limit the present disclosure.

As mentioned above, based on the objective of an algorithm for calculating the object distance, the conventional cleaning robot can achieve a high distance resolution either in close obstacles or far obstacles, but not in the whole detection range. Accordingly, the present disclosure further provides a distance measurement device (e.g., FIG. 1) that uses a first algorithm to calculate an object distance when an obstacle is within a predetermined distance from the device, but uses a second algorithm to calculate the object distance when the obstacle is farther than the predetermined distance to solve the issues of data overflow and easily affected by noises when the obstacle is too far from the device such that a high distance resolution is obtained in the whole detection range of the device.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A distance measurement device, comprising:
   a light source, configured to project a linear light section toward a moving direction;
   an image sensor, configured to capture an image frame containing an image of the linear light section; and
   a processor, configured to
      calculate a gravity center of the image of the linear light section in the image frame,
      use a first algorithm to calculate a first object depth upon the gravity center being smaller than a position threshold, and
      use a second algorithm to calculate a second object depth upon the gravity center being larger than the position threshold, wherein
   in the first algorithm, the first object depth is calculated according to a relationship between gravity centers and a reciprocal of depths, as well as a linear interpolation method, and
   in the second algorithm, the second object depth is calculated according to a relationship between gravity centers and depths, as well as a linear extrapolation method.

2. The distance measurement device as claimed in claim 1, wherein the linear light section is a vertical light section or a horizontal light section.

3. The distance measurement device as claimed in claim 1, wherein the position threshold is determined previously and according to an error of the first object depth calculated by the first algorithm being larger than an error threshold.

4. The distance measurement device as claimed in claim 1, wherein the position threshold is determined previously and according to a first error of the first object depth calculated by the first algorithm being larger than a second error of the second object depth calculated by the second algorithm.

5. The distance measurement device as claimed in claim 1, wherein the position threshold is determined previously using the first algorithm and according to a variation of a reciprocal of the first object depth with respect to the gravity center being smaller than a variation threshold.

6. The distance measurement device as claimed in claim 1, wherein the position threshold is determined previously using the second algorithm and according to a slope of second object depths with respect to the gravity center being larger than a slope threshold.

7. A distance measurement device, comprising:
   a light source, configured to project a linear light section toward a moving direction;
   an image sensor, configured to capture an image frame containing an image of the linear light section; and
   a processor, configured to
      calculate a gravity center of the image of the linear light section in the image frame,
      use a first algorithm to calculate a first object depth,
      upon the first object depth being smaller than a distance threshold, directly output the first object depth, and
      upon the first object depth being larger than the distance threshold, use a second algorithm to calculate a second object depth, wherein
   in the first algorithm, the first object depth is calculated according to a relationship between gravity centers and a reciprocal of depths, as well as a linear interpolation method, and
   in the second algorithm, the second object depth is calculated according to a relationship between gravity centers and depths, as well as a linear extrapolation method.

8. The distance measurement device as claimed in claim 7, wherein the linear light section is a vertical light section or a horizontal light section.

9. The distance measurement device as claimed in claim 7, wherein the distance threshold is determined previously and according to an error of the first object depth calculated by the first algorithm being larger than an error threshold.

10. The distance measurement device as claimed in claim 7, wherein the distance threshold is determined previously and according to a first error of the first object depth calculated by the first algorithm being larger than a second error of the second object depth calculated by the second algorithm.

11. The distance measurement device as claimed in claim 7, wherein the distance threshold is determined previously using the first algorithm and according to a variation of a reciprocal of the first object depth with respect to the gravity center being smaller than a variation threshold.

12. The distance measurement device as claimed in claim 7, wherein the distance threshold is determined previously using the second algorithm and according to a slope of second object depths with respect to the gravity center being larger than a slope threshold.

13. A distance measurement device, comprising:
   a light source, configured to project a linear light section toward a moving direction;
   an image sensor, configured to capture an image frame containing an image of the linear light section; and
   a processor, configured to
      use a first algorithm to calculate a first object depth upon a position of the image of the linear light section in the image frame not exceeding a predetermined position, and
      use a second algorithm to calculate a second object depth upon the position of the image of the linear light section in the image frame exceeding the predetermined position, wherein
   in the first algorithm, the first object depth is calculated according to a relationship between gravity centers and a reciprocal of depths, as well as a linear interpolation method, and in the second algorithm, the second object depth is calculated according to a relationship between gravity centers and depths, as well as a linear extrapolation method.

14. The distance measurement device as claimed in claim 13, wherein the linear light section is a vertical light section, and the predetermined position is one pixel column of the image frame.

15. The distance measurement device as claimed in claim 13, wherein the linear light section is a horizontal light section, and the predetermined position is one pixel row of the image frame.

16. The distance measurement device as claimed in claim 13, wherein the predetermined position is determined previously and according to a variation of the position of the image of the linear light section in the image frame with respect to a distance between the light source and an object on which the linear light section is projected being smaller than a variation threshold.

17. The distance measurement device as claimed in claim 13, wherein the predetermined position is determined previously and according to the position of the image of the linear light section in the image frame corresponding to a predetermined distance between the light source and an object on which the linear light section is projected.

* * * * *